US012759187B2

(12) United States Patent
Klöpper et al.

(10) Patent No.: US 12,759,187 B2
(45) Date of Patent: Oct. 13, 2026

(54) MULTI-PROFILE MILLING APPARATUS AND MACHINING DEVICE

(71) Applicants: HOMAG Kantentechnik GmbH, Lemgo (DE); Leitz GmbH & Co. KG, Oberkochen (DE)

(72) Inventors: Holger Klöpper, Bad Salzuflen (DE); Heiko Ehrensperger, Essingen (DE); Jürgen Graef, Oberkochen (DE); Andreas Kisselbach, Aalen (DE)

(73) Assignees: HOMAG Kantentechnik GmbH, Lemgo (DE); Leitz GmbH & Co. KG, Oberkochen (DE)

( * ) Notice: Subject to any disclaimer, the term of this patent is extended or adjusted under 35 U.S.C. 154(b) by 469 days.

(21) Appl. No.: 18/282,209

(22) PCT Filed: Mar. 15, 2022

(86) PCT No.: PCT/EP2022/056647
§ 371 (c)(1),
(2) Date: Sep. 14, 2023

(87) PCT Pub. No.: WO2022/194839
PCT Pub. Date: Sep. 22, 2022

(65) Prior Publication Data

US 2024/0157594 A1 May 16, 2024

(30) Foreign Application Priority Data

Mar. 17, 2021 (DE) .................... 10 2021 106 485.6

(51) Int. Cl.
*B27G 13/00* (2006.01)
*B27D 5/00* (2006.01)

(52) U.S. Cl.
CPC .......... *B27G 13/007* (2013.01); *B27D 5/006* (2013.01)

(58) Field of Classification Search
CPC .. B27G 13/007; B27D 5/006; B23C 2210/02; B23C 2210/244; B23C 2270/04
See application file for complete search history.

(56) References Cited

U.S. PATENT DOCUMENTS 4,610,285 A 9/1986 Derivaz

FOREIGN PATENT DOCUMENTS

CN 109648652 A 4/2019
DE 1291171 B 3/1969
(Continued)

OTHER PUBLICATIONS

English translation of EP 1044772 (Year: 2000).*
(Continued)

*Primary Examiner* — Moshe Wilensky
(74) *Attorney, Agent, or Firm* — Morgan, Lewis & Bockius LLP

(57) ABSTRACT

The invention relates to a multi-profile milling apparatus for machining workpieces. The apparatus can have a first milling device which has at least one first milling tool and at least one second milling device which has at least one second milling tool. The second milling device is movable relative to the first milling device between a use position and a non-use position. The apparatus can also include a locking device having at least one centrifugal element that can lock the at least one second milling device in the use position or the non-use position during a rotating movement of the milling devices.

15 Claims, 5 Drawing Sheets

(56) References Cited

FOREIGN PATENT DOCUMENTS

| | | | | |
|---|---|---|---|---|
| DE | 19915672 A1 | | 10/2000 | |
| EP | 1044772 A2 | * | 10/2000 | ............. B23C 3/126 |

OTHER PUBLICATIONS

International Search Report for International Application No. PCT/EP2022/056647, mailed Jun. 9, 2022, 4 pages including translation.

First Office Action in Chinese Patent Application No. 202280021986.3 dated Jul. 29, 2025, 7 pages.

* cited by examiner

MULTI-PROFILE MILLING APPARATUS AND MACHINING DEVICE

CROSS-REFERENCE TO RELATED APPLICATIONS

This application is a U.S. National Phase of International Application No. PCT/EP2022/056647, filed Mar. 15, 2022, which is an international application designating the United States and claiming the benefit of and priority to German Application No. 102021106485.6, filed Mar. 17, 2021, each of which is hereby incorporated by reference in its entirety.

TECHNICAL FIELD

The invention relates to a multi-profile milling apparatus for machining workpieces as well as a machining device.

PRIOR ART

DE 19 915 672 A1 discloses a multi-profile milling apparatus for machining workpiece edges. This multi-profile milling apparatus comprises two milling devices each having a milling tool with different machining profiles. In this regard, a first milling device is arranged in an operating position so as to machine the workpiece edge with a first machining profile. A second milling device can be moved axially with respect to the first milling device between a resting position and an operating position, whereby the machining profile of the second milling device superimposes the machining profile of the first milling device for the machining process. The setting movement of the second milling device is performed via a coupling fork that is controlled by a pneumatic cylinder. In order to lock the second milling device during the machining process, it is positioned without play, in particular in the operating position, by means of a hydraulic clamping device. Such a hydraulic clamping device has a complex structure and increases the costs of said multi-profile milling apparatus.

DESCRIPTION OF THE INVENTION

The invention is based on the object of proposing a multi-profile milling apparatus which has a simplified structural configuration and enables flexible integration into a machining device. Moreover, the invention is based on the object of proposing a machining device which has a high operational reliability in multi-profile milling machining.

A multi-profile milling apparatus is defined in claim 1. A machining device is defined in claim 14. Dependent claims relate to specific embodiments.

The object is solved by a multi-profile milling apparatus for machining workpieces that are preferably made of wood, wood materials, plastic, composite material and/or the like, in particular for machining edges of the workpieces, having a first milling device which is provided in an operating position and can be coupled to a drive shaft, and having at least one second milling device which is movable relative to the first milling device between a use position and a non-use position, wherein a locking device having at least one centrifugal element is provided and the at least one centrifugal element locks the at least one second milling device in the use position or the non-use position during a rotating movement of the milling devices.

With such a multi-profile milling apparatus, workpieces, in particular edges of workpieces, can be machined with different machining profiles, for example different radii or chamfers. This is achieved in that the second milling device is axially movable with respect to the first milling device, whereby a superimposition of the different machining profiles is provided for the machining process. By means of the at least one centrifugal element of the locking device, a fixation of the second milling device is thus provided in that the centrifugal element due to the centrifugal force created during the rotating movement locks the second milling device in the use position or the non-use position. The multi-profile milling apparatus moreover enables multi-profile machining of a circumferential edge on the workpiece, for example the circumferential edge limiting the narrow side of a plate-shaped workpiece.

A preferred embodiment of the multi-profile milling apparatus can provide that the first milling device and the at least one second milling device are arranged coaxially with respect to each other and the locking device is arranged to act between the milling devices.

Due to the coaxial arrangement of the two milling devices, a simple structural configuration of the multi-profile milling apparatus can be achieved, in which the second milling device is provided so as to be axially movable with respect to the first milling device. As the locking device acts between the milling devices, a compact configuration can moreover be achieved.

In a further preferred embodiment of the multi-profile milling apparatus, it can be provided that the at least one second milling device is axially displaceable and non-rotatably coupled to the first milling device.

In this way, a torque transmitted to the first milling device can be transmitted to the second milling device and, at the same time, the axial movability of the second milling device between the use position and the non-use position can be enabled.

An advantageous embodiment of the multi-profile milling apparatus can moreover provide that the locking device has at least two centrifugal elements, wherein at least one first centrifugal element locks the second milling device in the use position and at least one second centrifugal element locks the second milling device in the non-use position.

At least one centrifugal element each can thus be provided for locking the second milling device in the use position or in the non-use position, so that the second milling device is securely locked during the machining process.

Advantageously, the at least two centrifugal elements can be arranged in the multi-profile milling apparatus so as to be spaced apart from each other in an axial direction.

Since the at least two centrifugal elements are axially spaced apart from each other, with a defined distance between the centrifugal elements, exact positioning of the second milling device in the use position as well as in the non-use position can be provided. By keeping the axial distance between the at least two centrifugal elements as small as possible, it is also possible to create a short travel distance between the use position and the non-use position.

Particularly preferably, it can be provided in the multi-profile milling apparatus that the at least two centrifugal elements are each accommodated in a recess on the outer circumference of the first milling device, and at least one cavity is formed on the inner circumference of the second milling device, which is positioned in the use position of the second milling device to the at least one first centrifugal element and in the non-use position of the second milling device to the at least one second centrifugal element.

Apart from a particularly simple and compact configuration of the locking device, this also makes it possible that the locking device can be arranged to act directly between the milling devices. Moreover, the locking device can thus be provided so as to be protected between the milling devices, so that a reduced impairment due to dirt, dust, sawdust or the like can be achieved.

In an alternative embodiment of the multi-profile milling apparatus, it can moreover be provided that the at least one centrifugal element is accommodated in a recess on the outer circumference of the first milling device, and at least two cavities are formed axially spaced apart from each other on the inner circumference of the second milling device, wherein in the use position of the second milling device a first cavity is positioned to the centrifugal element and in the non-use position a second cavity is positioned to the centrifugal element.

With this configuration of the locking device, a reduction of the centrifugal elements can be achieved.

Advantageously, it can be provided in the multi-profile milling apparatus that at least one centrifugal element is transferred to a locking position by the rotating movement of the milling devices, in which the at least one centrifugal element is arranged in part in the recess on the outer circumference of the first milling device and in part in the at least one corresponding cavity on the inner circumference of the second milling device.

Thus, it can be achieved that the at least one centrifugal element securely locks the second milling device during the rotating movement of the milling devices and, during a standstill, releases the at least one second milling device for the transfer between the use position or non-use position.

Particularly preferably, it can be provided in the multi-profile milling apparatus that the at least one centrifugal element is configured as a sphere or as a cylindrical body, whose radially outwardly facing end face is rounded or conical.

Corresponding to the spherical or cylindrical centrifugal element, the corresponding recess can be configured as a bore with a minimally larger diameter than the spherical or cylindrical centrifugal element. Thus, axial play of the spherical or cylindrical centrifugal element can be minimized or eliminated.

A further preferred embodiment of the multi-profile milling apparatus can provide that the at least one cavity on the inner circumference of the second milling device has an inclined surface arranged on the side of the use position in the longitudinal section of the second milling device and is preferably configured in a V-shape.

Since the centrifugal element abuts the inclined surfaces of the V-shaped cavity in the locking position and exerts a radial force thereon due to the centrifugal force, the second milling device can be automatically centered in the use position and/or non-use position due to the V-shaped configuration of the cavity.

A particularly preferred embodiment of the multi-profile milling apparatus can provide that the at least one first centrifugal element in the locking position acts on the inclined surface of the at least one cavity in such a way that an axial force component is created which pushes the second milling device in the use position against at least one stopper defining the use position.

By means of this configuration, a defined axial stopper can be created for the use position, so that the second milling device can be positioned without play during the machining process. The stopper can be formed in connection with at least one stopper element between the first and the second milling device. In particular, the at least one centrifugal element is dimensioned in such a way that the axial force component generated by the centrifugal force is greater than the axial forces generated by the machining process. Moreover, it can be provided that the at least one second centrifugal element in the locking position acts in such a way on a further inclined surface of the cavity arranged on the side of the non-use position that an axial force component pushes the second milling device in the non-use position against at least one stopper defining the non-use position.

In an advantageous embodiment of the multi-profile milling apparatus, the at least one stopper defining the use position and/or the non-use position can have at least one dot-shaped or cam-shaped stopper surface.

Thus, a particularly small contact surface of the stopper can be achieved, so that the possibility of reduced accuracy due to dirt, for example adhering foreign matter such as dust or sawdust, can be minimized. Preferably, the stopper is formed by three dot-shaped or cam-shaped stopper surfaces. In this way, a defined stopper plane can be formed that enables precise positioning of the second milling device in particular in the use position. Advantageously, the at least one stopper can be arranged so as to be concealed between an outer circumference of the first milling device and an inner circumference of the second milling device. In this way, the at least one stopper can be protected against dirt.

A further advantageous embodiment of the multi-profile milling apparatus can provide that the at least one stopper defining the use position is provided so as to be axially displaceable by an adjusting device.

In this way, an axial position of the stopper surfaces with respect to each other can be changeable, for example by means of an eccentric, whereby a precise axial positioning of the second milling device can be provided.

An advantageous embodiment of the multi-profile milling apparatus can moreover provide that a depth of the cavity is configured in such a way that, in the locking position, at least half of the at least one spherical or cylindrical centrifugal element is arranged in the recess.

Thus, axial play between the at least one spherical centrifugal element and the recess can be minimized since, in the locking position, the centrifugal element with the largest diameter remains in the recess. In this way, an axial movement of the centrifugal element in the locking position can be prevented.

In a further embodiment of the multi-profile milling apparatus, a tracer roller can moreover be provided which is supported on the first milling device and/or the drive shaft so as to be rotationally decoupled.

This tracer roller can provide a guided movement of the multi-profile milling apparatus to the workpiece during the machining process, whereby a uniform and thus high-quality machining result can be achieved.

The object is moreover solved by a machining device for machining workpieces that are preferably made of wood, wood materials, plastic, composite material and/or the like, in particular for machining edges of the workpieces, having a workpiece support for accommodating at least one workpiece, a multi-profile milling apparatus for performing the machining process on the workpiece, a driving apparatus for driving the multi-profile milling apparatus as well as a conveying device for bringing about a relative movement between the workpiece and the multi-profile milling apparatus, wherein the multi-profile milling apparatus is configured according to one of the embodiments described above.

The machining device with such a multi-profile milling apparatus enables the machining of workpieces, in particular edges of workpieces, with different machining profiles. The machining profiles can, for example, have different radii or chamfers. In this way, setup times for changing tools for different machining profiles can be avoided, thus achieving time and cost-saving machining of the workpieces.

A preferred embodiment of the machining device can provide that a setting device is provided that controls a setting movement of the at least one second milling device between the use position or the non-use position.

With such a setting device, automation of the multi-profile machining can be achieved in that the setting device is controlled by a controller, for example, so that the axial setting movement of the second milling device is performed depending on the machining profile to be created.

In a further advantageous embodiment of the machining device, a sensor device can be provided which detects a setting position of the at least one second milling device.

Such a sensor device enables the precise detection of the setting position of the second milling device, so that control of the machining process can be enabled by the detection signal.

BRIEF DESCRIPTION OF THE DRAWINGS

Further features and advantages of a device, a use and/or a method will be apparent from the following description of embodiments with reference to the accompanying drawings. In these drawings.

DESCRIPTION OF EMBODIMENTS

Identical reference numbers used in different figures designate identical, corresponding or functionally similar elements.

Figure 1:
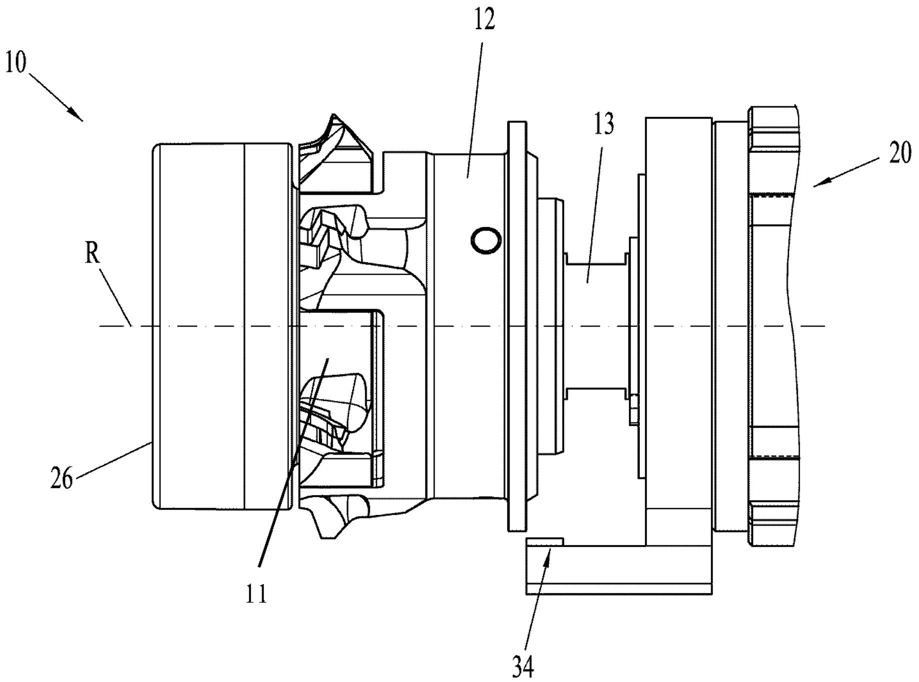
FIG. 1 shows a side view of an embodiment of a multi-profile milling apparatus according to the disclosure.
Figure 2:
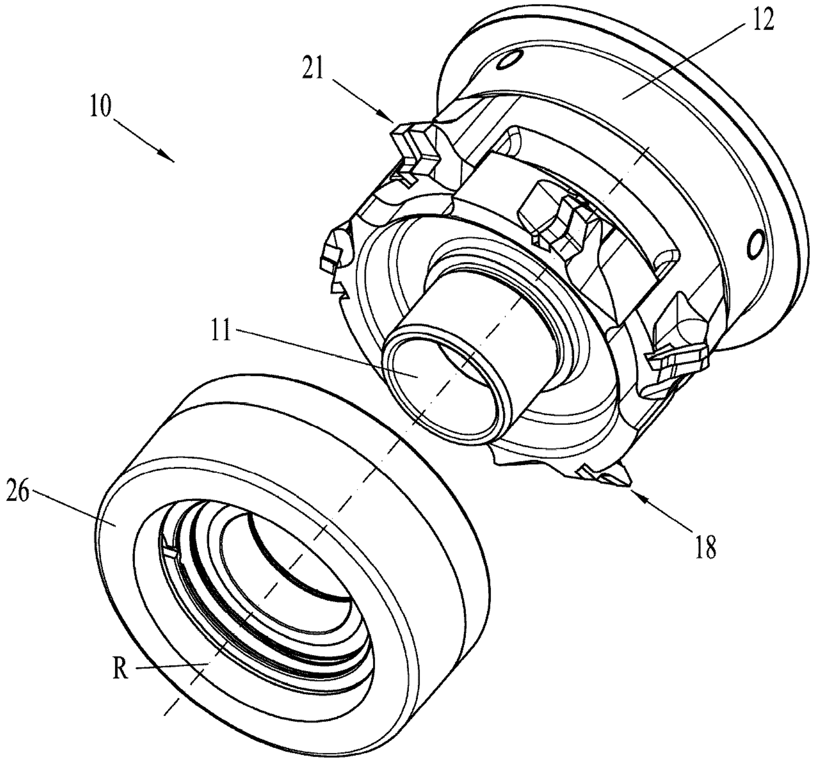
FIG. 2 shows a perspective, partially exploded view of the multi-profile milling apparatus in FIG. 1 with an unmounted tracer roller.

FIG. 1 shows a side view of an embodiment of a multi-profile milling apparatus 10 according to the disclosure, and FIG. 2 shows a perspective, partially exploded view of the multi-profile milling apparatus 10 with an unmounted tracer roller 26. Such a multi-profile milling apparatus 10 is provided for machining workpieces with different machining profiles or milling profiles. In particular, the multi-profile milling apparatus 10 is provided for machining edges of the workpieces. For this purpose, the multi-profile milling apparatus 10 can be coupled via a corresponding interface to a machining device 20 indicated in FIG. 1.

The machining device 20 can be any machine tool for machining workpieces. In particular, the machining device 20 is configured as a wood-machining device. The machining device 20 can be configured as a pass-through machine or as a stationary machine tool. In a pass-through machine, the machining of the workpieces is performed in a continuous process, wherein the workpieces are moved through a transport device relative to the multi-profile milling apparatus 10. Moreover, the multi-profile milling apparatus 10 can be movably arranged by a setting device in an X-, Y- and/or Z-direction relative to the workpiece. In a stationary machine tool, the workpiece can be held stationary and the multi-profile milling apparatus 10 can be movable by a setting device relative to the workpiece. The machining device can also be configured as a CNC-controlled machining device or a CNC-controlled machining center.

The workpieces to be machined are in particular workpieces that are made at least in part of wood, wood materials, plastic, composite material or the like. These can be different workpieces, for example solid wood boards or chipboards, lightweight boards, sandwich boards, skirting boards, profiles or the like. Preferably, the workpieces are plate-shaped workpieces. However, the present invention is not limited to the machining of such workpieces and materials.

The multi-profile milling apparatus 10 comprises a first milling device 11, a second milling device 12 and a tracer roller 26. The two milling devices 11, 12 are each formed by a basic body arranged coaxially with respect to each other and rotatable about a joint rotation axis R. The milling devices 11, 12 each form an essentially rotationally symmetrical body.

The first milling device 11 can be non-rotatably coupled to a drive shaft 13 for transmitting a torque, for example by a screw connection. The first milling device 11 and the drive shaft 13 can also be formed integrally. The drive shaft 13 can be coupled to a driving apparatus of the machining device 20 by means of an interface not illustrated in detail. The drive shaft 13 can also be a component of the machining device 20 and be non-rotatably coupled to the first milling device 11 via an interface.

The second milling device 12 is provided coaxially to the first milling device 11 and arranged with an inner circumference 14 on an outer circumference 16 of the first milling device 11. The outer circumference 16 of the first milling device 11 and the inner circumference 14 of the second milling device 12 are at least sectionally configured in parallel to the joint rotation axis R. Thus, the second milling device 12 is provided on the outer circumference 14 of the first milling device 11 so as to be axially displaceable to the first milling device 11. A torque introduced via the drive shaft 13 can be transmitted to the second milling device 12 via the first milling device 11, so that the two milling devices 11, 12 are in sync. The synchronization can be realized, for example, by a driver or a shaped profile. Thus, the second milling device 12 is both axially displaceable and non-rotatably coupled to the first milling device 11.

On an end face of the first milling device 11, a first milling tool 18 is provided which forms a first machining profile 19 for machining the workpiece. In particular, the first machining profile 19 is configured as a defined milling radius or a defined milling chamfer for machining the workpiece edge. The first milling tool 18 can be detachably fastened on the first milling device 11 by a fastening means. The first milling tool 18 is arranged in a fixed operating position and, by a rotating movement about the rotation axis R and a relative movement between the workpiece and the multi-profile milling apparatus 10, mills an edge of the workpiece with regard to the corresponding first machining profile 19.

On an end face of the second milling device 12, which is allocated to the first milling tool 18, a second milling tool 21 is provided that forms a second machining profile 22 for machining the workpiece. In particular, the second machining profile 22 is configured as a milling radius or milling chamfer deviating from the first machining profile 19. The second machining profile 22 of the second milling tool 21 can have a smaller milling radius than the first machining profile 19 of the first milling tool 18. The second milling tool 21 can be fastened on the second milling device 12 by a fastening means.

Figure 3:
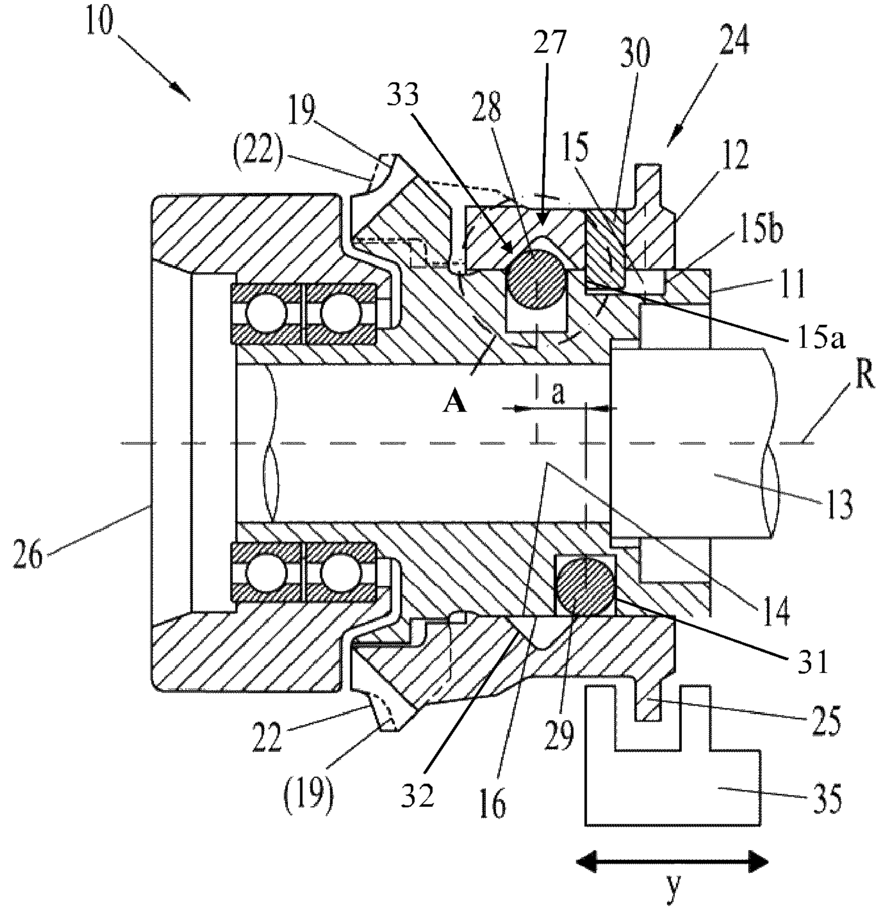
FIG. 3 shows a schematic sectional view of the multi-profile milling apparatus with a second milling device in a use position.
Figure 5:
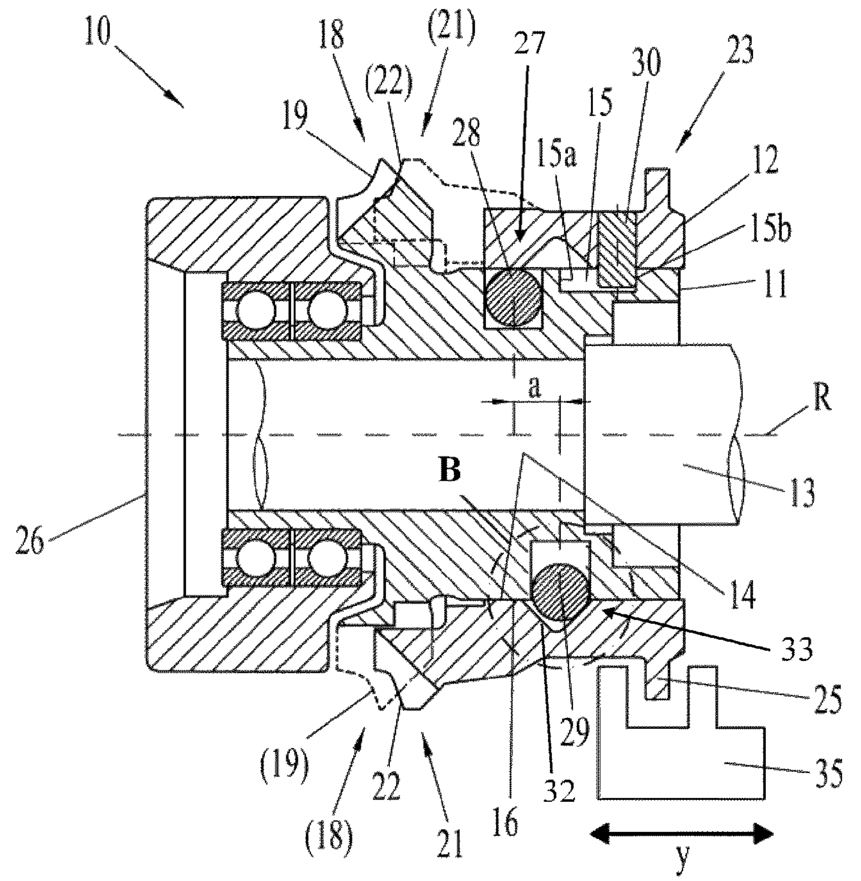
FIG. 5 shows a schematic sectional view of the multi-profile milling apparatus with the second milling device in a non-use position.

FIGS. 3 and 5 each show sectional views of the multi-profile milling apparatus 10; in FIG. 3, the second milling device 12 is provided in a use position 24 and, in FIG. 5, the first milling device 11 is provided in the operating position. By the axial displacement of the second milling device 12 relative to the first milling device 11, it is transferred from the use position 24 illustrated in FIG. 3 to the non-use position 23 illustrated in FIG. 5. In the use position 24, the second milling tool 21 is arranged in an operating position in such a way that cutting elements of the second milling tool 21 of the second milling device 12 engage in gaps between cutting elements of the first milling tool 18 of the first milling device 11, so that the second machining profile 22 of the second milling tool 21 superimposes the first machining profile 19 of the first milling tool 18. The multi-profile milling apparatus 10 is consequently configured in such a way that the second machining profile 22 of the second milling tool 21 superimposes the first machining profile 19 of the first milling tool 18 in such a manner that the workpiece is machined by the second machining profile 22 when the second milling device 12 is in the use position 24. Thus, it is ensured that, although both milling tools 18, 21 simultaneously machine a workpiece, only the machining profile 22 of the second milling tool 21 is transferred to the workpiece.

Moreover, the multi-profile milling apparatus 10 comprises the tracer roller 26 for performing a guided machining process. During the machining process, said roller rolls with an outer circumference over a workpiece surface adjacent to the workpiece edge and thus guides the multi-profile milling apparatus 10 to the workpiece. The tracer roller 26 is supported on the first milling device 11 so as to be rotationally decoupled, for example by means of one or more roller bearings. Thus, the tracer roller 26 can perform the rolling movement over the workpiece surface irrespective of the rotating movement of the milling devices 11, 12. The tracer roller 26 can be supported, for example, in an end face bore in the first milling device 11. The first and the second milling device 11, 12 have the same basic diameter, so that the machining process can be carried out with each of the milling devices 11, 12 in interaction with the tracer roller 26.

FIG. 3 shows a locking device 27 which locks the second milling device 12 during the rotating movement of the milling devices 11, 12 in the axial direction. The locking device 27 has a plurality of centrifugal elements 28, 29 and is arranged to act between the two milling devices 11, 12 during the rotating movement. During the rotating movement of the milling devices 11, 12, a first centrifugal element 28 locks the second milling device 12 in the use position 24 (FIG. 3) and a second centrifugal element 29 locks the second milling device 12 in the non-use position 23 (FIG. 5).

The centrifugal elements 28, 29 are arranged so as to be spaced apart from each other in an axial direction at a distance a on the outer circumference 16 of the first milling device 11. Thus, the centrifugal elements 28, 29 are provided in two planes axially spaced apart from each other which extend perpendicular to the rotation axis R on the outer circumference 16. The distance a can preferably be provided so as to be relatively small in order to create as short a travel distance as possible between the use position 24 and the non-use position 23. For this purpose, the centrifugal elements 28, 29 can at least partially overlap in a radial plane within the distance a. In this regard, it can be advantageous to use centrifugal elements 28, 29 with as small a diameter as possible. In order to create the centrifugal forces necessary for secure locking with small centrifugal elements 28, 29, a plurality of centrifugal elements 28, 29 can be used. The centrifugal elements 28, 29 can also be made of a material with high density, e.g., hard metal. Preferably, the centrifugal elements 28, 29 are arranged on the first milling device 11 in such a way with respect to each other that an imbalance is avoided.

In the following description, it is to be noted that a plurality of centrifugal elements 28, 29 can be provided in a joint plane perpendicular to the rotation axis R on the outer circumference 16 of the first milling device 11, although only one centrifugal element 28, 29 each is described below. The centrifugal elements 28, 29 are each accommodated in a recess 31 on the outer circumference 16 of the first milling device 11. The recesses 31 are formed in particular as bores.

Corresponding to the centrifugal elements 28, 29, a cavity 32 is formed on the inner circumference 14 of the second milling device 12, which can be positioned by the axial displacement of the second milling device 12 relative to the first milling device 11 to the centrifugal elements 28, 29. The cavity 32 can be formed in an axial plane entirely on the inner circumference 14. The cavity can be a slot or a groove. It can also be provided that a plurality of cavities 32 are formed in a joint axial plane on the inner circumference 14, wherein the cavities 32 are each aligned with respect to the corresponding centrifugal elements 28, 29.

In the use position 24, the cavity 32 is positioned with respect to the first centrifugal element 28 in such a way that, during a rotating movement of the milling devices 11, 12, the first centrifugal element 28 is transferred to a locking position 33 due to the centrifugal force, in which the first centrifugal element 28 is arranged partially in the recess 31 and in the cavity 32. While the rotating movement is carried out, the second milling device 12 is thus axially locked in the use position 24.

In the embodiment of the multi-profile milling apparatus 10 according to FIG. 3, the centrifugal elements 28, 29 are each configured as a sphere. The diameter of the spherical centrifugal elements 28, 29 is provided to be minimally smaller than a diameter or an axial width of the recess 31. Thus, axial play of the centrifugal elements 28, 29 in the recesses 31 is minimal and, at the same time, radial movement of the centrifugal elements 28, 29 is enabled. To generate a large centrifugal force for locking during the rotating movement, the centrifugal elements 28, 29 are in particular made of a metal material.

The cavity 32 is configured in a V-shape in the longitudinal section of the multi-profile milling apparatus 10. The depth of the V-shaped cavity 32 can be configured in such a way that the spherical centrifugal elements 28, 29 are arranged at least in half in the recess 31 in the locking position 33.

By means of the V-shaped configuration of the cavity 32 in combination with a stopper element 30 and two stoppers 15$a$, 15$b$ of a recess 15 between the first and second milling device 11, 12, the second milling device 12 is centered in the use position 24 and the non-use position 23 when the centrifugal element 28, 29 is arranged in the locking position 33 during the rotating movement and abuts one of the inclined surfaces 32$a$, 32$b$ of the V-shaped cavity 32. Due to this centering, the second milling tool 18 is exactly positioned in the use position 24 or the non-use position 23 during the machining process on the workpiece.

Figure 4:
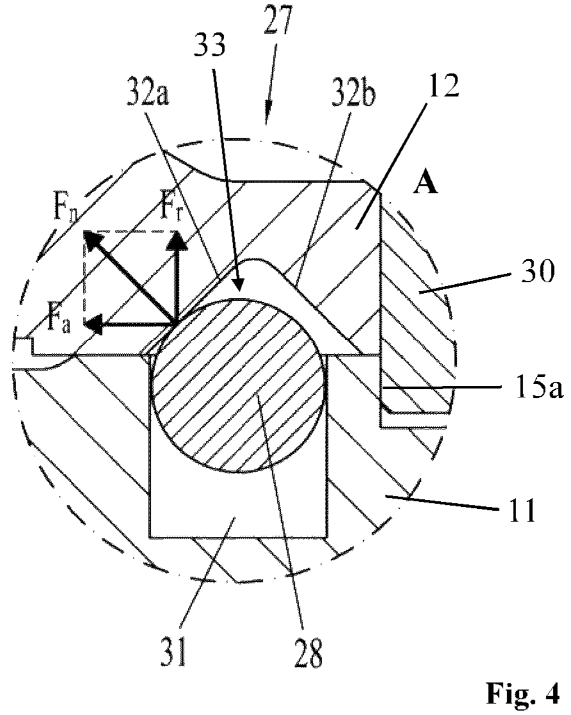
FIG. 4 shows a detailed view of a centrifugal device of the multi-profile milling apparatus according to detail A in FIG. 3.

FIG. 4 shows a detailed view of the locking device 27 according to detail A in FIG. 3, in which the centrifugal element 28 is transferred into the locking position 33 and locks the second milling device 12 in the use position 24. In this regard, the cavity 32 is arranged in such a way with respect to the centrifugal element 28 that the centrifugal element 28 only acts on the inclined surface 32$a$ of the V-shaped cavity 32, which is arranged on the side of the use position 24. Thus, the radially acting centrifugal force $F_r$ is deflected at the inclined surface 32$a$ and an axial force component $F_a$ is created which pushes the second milling device 12 with the stopper element 30 against the stopper 15$a$ defining the use position 24. $F_a$ and $F_r$ together result in the normal force $F_n$ which acts perpendicularly on the sidewall 32$a$.

Due to the spherical configuration of the centrifugal elements 28, 29 and due to the V-shaped configuration of the cavity 32, the second milling device 12 is automatically released upon a reduction of torque or a standstill of the multi-profile milling apparatus 10, so that the axial movement of the second milling device 12 is possible.

Figure 6:
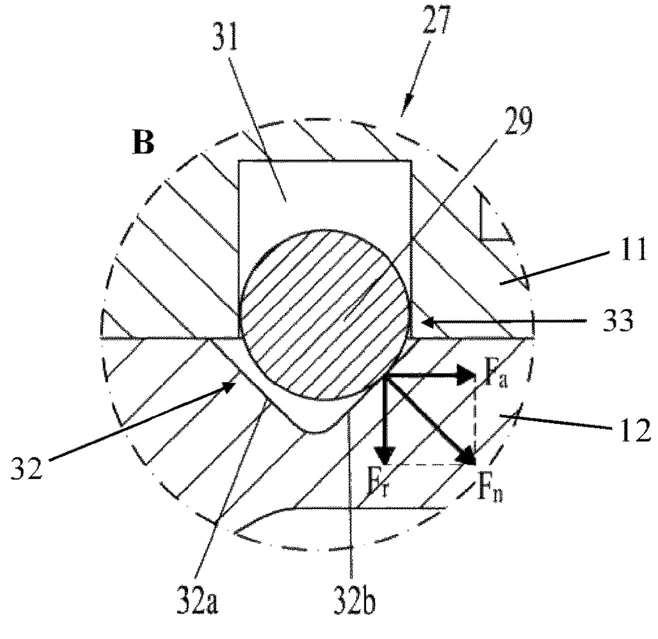
FIG. 6 shows a detailed view of the centrifugal device of the multi-profile milling apparatus according to detail B in FIG. 5.

FIG. 5 shows a schematic side view of the multi-profile milling apparatus 10 with the second milling device 12 in the non-use position 23, and FIG. 6 shows a detailed view of the locking device 27 according to detail B in FIG. 5.

In the non-use position 23, the cavity 32 is positioned with respect to the second centrifugal element 29 in such a way that, during the rotating movement of the milling devices 11, 12, the second centrifugal element 29 is transferred to the locking position 33 due to the centrifugal force, in which the second centrifugal element 29 is partially arranged in the recess 31 and in the cavity 32. While the rotating movement is carried out, the second milling device 12 is thus axially locked in the non-use position 23.

As shown in the detailed view according to FIG. 6, the centrifugal element 29 in the locking position 33 only acts on the inclined surface 32$b$ of the V-shaped cavity 32, which is arranged on the side of the non-use position 23. The radially acting centrifugal force $F_r$ is deflected at the inclined surface 32$b$ and creates the axial force component $F_a$ which pushes the second milling device 12 with the stopper element 30 against the stopper 15$b$ defining the non-use position 23.

The locking device 27 of said first embodiment of the multi-profile milling apparatus 10 can alternatively be configured in such a way that the second milling device 12 is locked in the non-use position 23 by the contact of the second centrifugal element 29 with both inclined surfaces 32$a$, 32$b$ of the cavity 32. In this case, it is not provided that the stopper element 30 touches the stopper 15$b$ in the non-use position 23.

Figure 7:
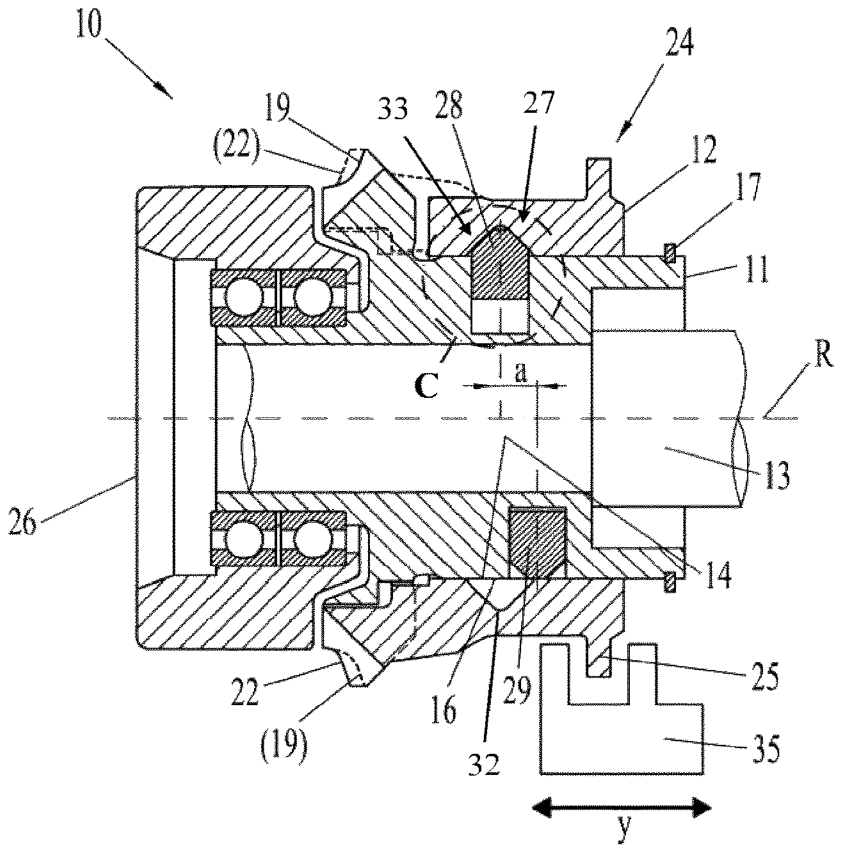
FIG. 7 shows a schematic sectional view of an alternative embodiment of the multi-profile milling apparatus with the second milling device in the use position.
Figure 8:
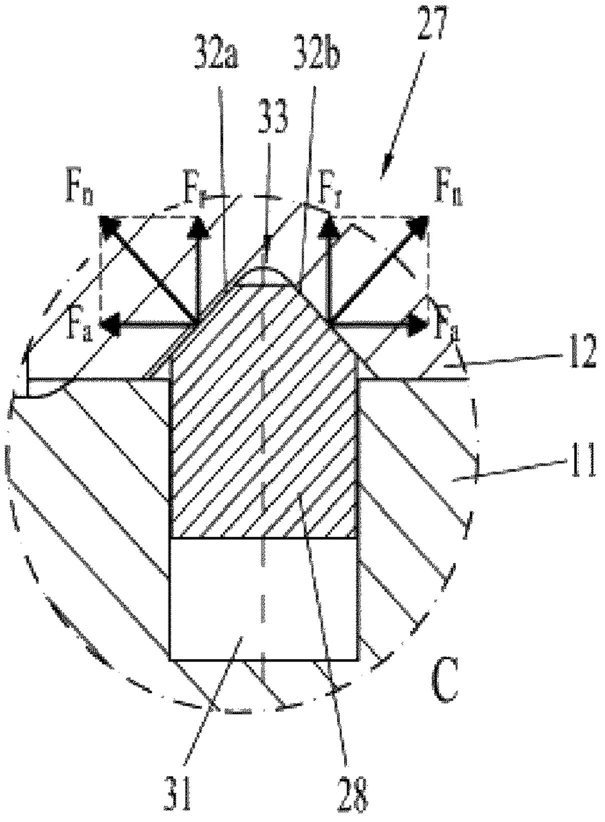
FIG. 8 shows a detailed view of the centrifugal device of the alternative embodiment of the multi-profile milling apparatus according to detail C in FIG. 7.
Figure 9:
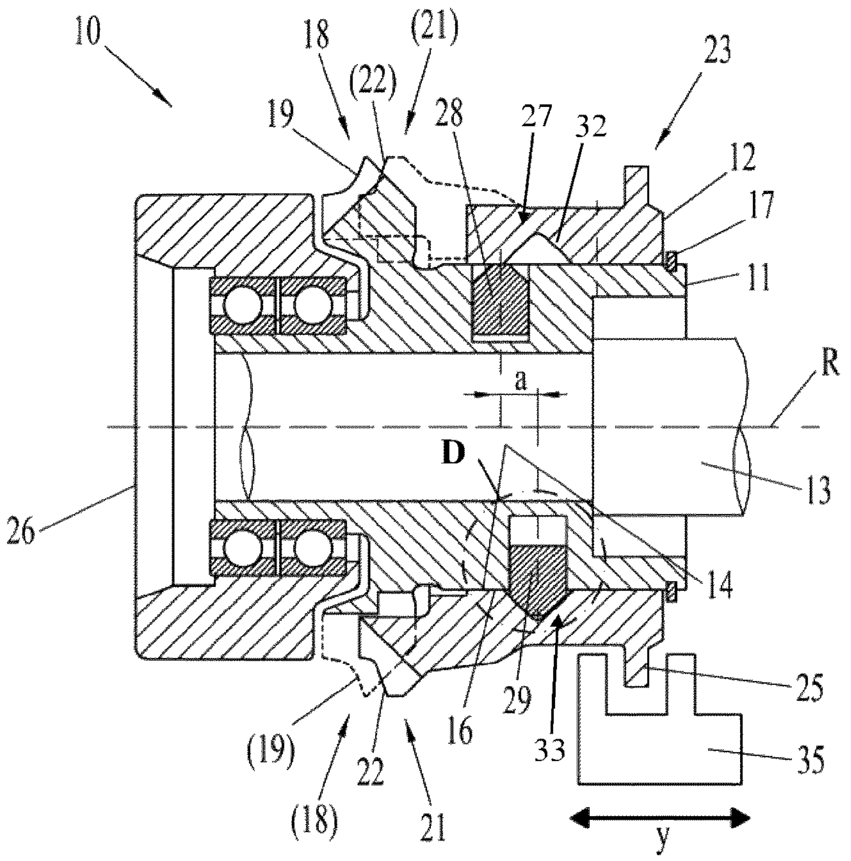
FIG. 9 shows a schematic sectional view of the alternative embodiment of the multi-profile milling apparatus with the second milling device in the non-use position.
Figure 10:
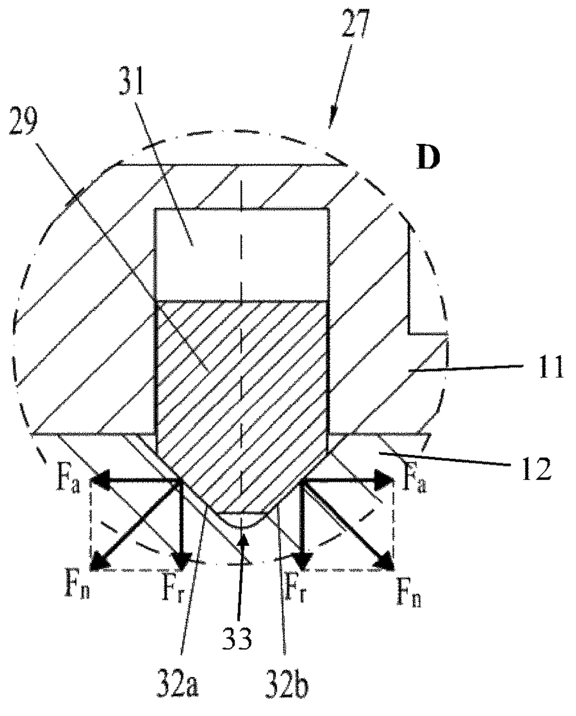
FIG. 10 shows a detailed view of the centrifugal device of the alternative embodiment of the multi-profile milling apparatus according to detail D in FIG. 9.

FIGS. 7 to 10 show sectional views of an alternative embodiment of the multi-profile milling apparatus 10, wherein in FIG. 7 the second milling device 12 is arranged in the use position 24 and in FIG. 9 in the non-use position 23. FIGS. 8 and 10 show detailed views of the locking device 27. In this alternative embodiment of the multi-profile milling apparatus 10, the positioning of the second milling device 12 in the use position 24 and in the non-use position 23 is provided exclusively by the centrifugal elements 28 and 29.

In this embodiment, the centrifugal elements 28, 29 are configured cylindrically with a conical end face. The cylinder shape makes it possible to increase the mass and thus the centrifugal force compared to spherical centrifugal elements 28, 29 with the same diameter. However, the centrifugal elements 28, 29 can be configured as a sphere also in this embodiment. The spherical centrifugal elements 28, 29 of the first embodiment of the multi-profile milling apparatus 10 can also be configured as such cylindrical centrifugal elements 28, 29.

Both in the use position 24 (FIGS. 7 and 8) and in the non-use position 23 (FIGS. 9 and 10), the centrifugal element 28 or 29 acts with the conical end face on the two inclined surfaces 32$a$, 32$b$ of the V-shaped cavity 32. Thus, two axial force components $F_a$ are created in axially opposite directions, whereby the second milling device 12 is axially fixed.

In this regard, an axial limitation of a maximum travel distance is thus provided in the direction of the use position 24 by a contact of the second milling device 12 with a step of the first milling device 11. In the direction of the non-use position 23, an axial limitation of the travel distance of the second milling device 12 is provided by a further step 17 that is configured, for example, in the form of a circlip.

As an alternative to the limitation of the axial travel distance by the step 17 as well as the further step, a stopper element 30 can be provided on the second milling device 12 in analogy to the first embodiment, the travel distance of which is limited by the stopper surfaces 15$a$, 15$b$ of the recess 15. In this embodiment, however, the stopper element 30 is exclusively provided for limiting the maximum travel distance and not for positioning the second milling device 12 in the use position 24 or the non-use position 23.

In order to axially move the second milling device 12 between the non-use position 23 and the use position 24, a setting device 35 can be provided on the machining device 20, which controls the axial setting movement. The setting device 35 can be configured both by mechanical means or pneumatic means or by an electric or magnetic drive. As shown in FIGS. 3, 5, 7 and 9, the setting device 35 acts on the second milling device 12 with a protrusion 25 and changes its position in the axial direction y between the use position 24 and the non-use position 23. In this regard, the setting movement can be performed both by the setting device 35 relative to the stationary machining device 20 or reversely by a setting movement of the machining device 20 relative to a stationary setting device 35.

In addition, the machining device can have a sensor device 34 (FIG. 1) for detecting the position of the second milling device 12. The sensor device 34 can have at least two sensors which detect the positioning of the second milling device 12 in the use position 24 and the non-use position 23. The sensor device 34 can transmit a sensor signal to a control device of the machining device, and the machining process and/or the setting movement of the second milling device 12 can be controlled depending on the control signal.

It is apparent to the person skilled in the art that individual features described in different embodiments can also be implemented in a single embodiment, provided that they are not structurally incompatible. Similarly, various features described in the context of a single embodiment may also be provided in several embodiments either individually or in any suitable sub-combination.

The invention claimed is:

1. A multi-profile milling apparatus for machining workpieces, the apparatus comprising a first milling device having at least one first milling tool with a first machining profile, the first milling device having an operating position and being configured to be coupled to a drive shaft, the apparatus further comprising at least one second milling device having at least one second milling tool with a second machining profile, the at least one second milling device being movable relative to the first milling device between a use position and a non-use position, the apparatus further comprising a locking device having at least one centrifugal element being configured to lock the at least one second milling device in the use position or the non-use position during a rotating movement of the first or second milling devices, the first milling device and the at least one second milling device being arranged coaxially with respect to each other and the locking device being positioned between the milling devices.

2. A multi-profile milling apparatus according to claim 1, wherein the at least one second milling device is axially displaceable and non-rotatably coupled to the first milling device.

3. A multi-profile milling apparatus according to claim 1, wherein the locking device has at least two centrifugal elements, wherein at least one first centrifugal element locks the second milling device in the use position and at least one second centrifugal element locks the second milling device in the non-use position.

4. A multi-profile milling apparatus according to claim 3, wherein the at least two centrifugal elements are each accommodated in a recess on the outer circumference of the first milling device, and wherein at least one cavity is formed on an inner circumference of the second milling device, wherein in the use position of the second milling device the at least one cavity is position adjacent to the at least one first centrifugal element and in the non-use position of the second milling device the at least one cavity is positioned adjacent to the at least one second centrifugal element.

5. A multi-profile milling apparatus according to claim 1, wherein the at least one centrifugal element is accommodated in a recess on the outer circumference of the first milling device, and at least two cavities are formed axially spaced apart from each other on an inner circumference of the second milling device, wherein in the use position of the second milling device a first cavity is positioned adjacent to the centrifugal element and in the non-use position a second cavity is positioned adjacent to the centrifugal element.

6. A multi-profile milling apparatus according to claim 4, wherein at least one centrifugal element is transferred to a locking position by the rotating movement of the milling devices, in which the at least one centrifugal element is arranged at least partially in the recess on an outer circumference of the first milling device and at least partially in the at least one corresponding cavity on the inner circumference of the second milling device.

7. A multi-profile milling apparatus according to claim 1, wherein the at least one centrifugal element is configured as a sphere or as a cylindrical body having a rounded or conical radially outwardly facing end face.

8. A multi-profile milling apparatus according to claim 4, wherein the at least one cavity on the inner circumference of the second milling device has an inclined surface arranged on a side of the at least one cavity facing the use position in a longitudinal section of the second milling device.

9. A multi-profile milling apparatus according to claim 8, wherein the at least one first centrifugal element can be moved to a locking position in which the at least one first centrifugal element acts on the inclined surface of the at least one cavity to cause an axial force component ($F_a$) to push the second milling device in the use position against at least one stopper defining the use position.

10. A multi-profile milling apparatus according to claim 9, wherein the at least one stopper comprises at least one dot-shaped or cam-shaped stopper surface.

11. A multi-profile milling apparatus according to claim 9, wherein the at least the at least one stopper is configured to be axially displaceable by an adjusting device.

12. A multi-profile milling apparatus according to claim 4, wherein a depth of the at least one cavity is configured such that, in the locking position, at least half of the at least one spherical or cylindrical centrifugal element is arranged in the recess.

13. A machining device for machining workpieces, the device having a workpiece support for accommodating at least one workpiece, a multi-profile milling apparatus according to claim 1 and for performing the machining process on the workpiece, a driving apparatus for driving the multi-profile milling apparatus, and a conveying device for causing a relative movement between the workpiece and the multi-profile milling apparatus.

14. A machining device according to claim 12, further comprising a setting device that controls a setting movement of the at least one second milling device between the use position and the non-use position.

15. A machining device according to claim 12, further comprising a sensor device for detecting a setting position of the at least one second milling device.

* * * * *